(12) United States Patent
Crews

(10) Patent No.: US 10,117,415 B2
(45) Date of Patent: Nov. 6, 2018

(54) MOUNTABLE FEED BUCKET

(71) Applicant: Lock-N-Load Feed Systems, LLC, Barboursville, WV (US)

(72) Inventor: William Gregory Crews, Baboursville, WV (US)

( * ) Notice: Subject to any disclaimer, the term of this patent is extended or adjusted under 35 U.S.C. 154(b) by 217 days.

(21) Appl. No.: 15/287,417

(22) Filed: Oct. 6, 2016

(65) Prior Publication Data
US 2018/0049404 A1 Feb. 22, 2018

Related U.S. Application Data

(60) Provisional application No. 62/376,061, filed on Aug. 17, 2016.

(51) Int. Cl.
*A01K 5/01* (2006.01)

(52) U.S. Cl.
CPC .............. *A01K 5/01* (2013.01); *A01K 5/0107* (2013.01)

(58) Field of Classification Search
CPC ................................ A01K 5/01; A01K 5/0107
USPC ................... 119/51.01, 58, 61.1, 61.5, 61.57
See application file for complete search history.

(56) References Cited

U.S. PATENT DOCUMENTS

| | | | | |
|---|---|---|---|---|
| 2,309,830 A * | 2/1943 | Dearle | ................. | A01K 1/0356 119/464 |
| 4,798,170 A * | 1/1989 | DePiazzy | ............. | A01K 1/0356 119/61.57 |
| 4,821,678 A * | 4/1989 | Atchley | ................. | A01K 39/02 119/464 |
| 5,467,733 A * | 11/1995 | Messina | ............... | A01K 1/0356 119/464 |
| 5,669,329 A * | 9/1997 | Krause | ................. | A01K 1/0356 119/477 |
| 6,189,489 B1 | 2/2001 | Pearce | | |
| 6,427,958 B1 | 8/2002 | Looney | | |
| 7,513,219 B2 * | 4/2009 | Louden | ................ | A01K 1/0356 119/477 |
| 7,789,041 B1 * | 9/2010 | Taylor | .................. | A01K 5/0114 119/51.01 |

(Continued)

FOREIGN PATENT DOCUMENTS

| KR | 200448348 Y1 | 3/2010 |
|---|---|---|
| KR | 101630603 B1 | 6/2016 |

OTHER PUBLICATIONS

International Search Report and Written Opinion pertaining to PCT/US2016/056021 dated May 11, 2017.

*Primary Examiner* — David J Parsley
(74) *Attorney, Agent, or Firm* — Dinsmore & Shohl LLP; Monika L'Orsa Jaensson

(57) ABSTRACT

A mountable feed bucket having a receptacle and being suitable for securing to a fence rail. The receptacle includes one or more brackets forming a vacuous area for receiving the fence rail. Further, a method of mounting a feed bucket on a fence rail including the steps of providing a mountable feed bucket having a receptacle with a bracket for securing the mountable feed bucket to the fence rail; securing the mountable feed bucket to the fence by positioning the bracket about a fence rail so that the rail is within a vacuous area between the back receptacle wall and a portion of the bracket; inserting a pin through an aperture of the bracket a distance so that the pin rests securely upon the fence rail; and securing the pin through the aperture and against the fence rail.

20 Claims, 3 Drawing Sheets

(56) References Cited

U.S. PATENT DOCUMENTS

| | | | |
|---|---|---|---|
| 8,833,596 B2* | 9/2014 | Sanguinet | B65D 25/22 211/71.01 |
| 2005/0217593 A1 | 10/2005 | Rice | |
| 2007/0045492 A1* | 3/2007 | Moran | A01K 1/0356 248/222.11 |

* cited by examiner

MOUNTABLE FEED BUCKET

BACKGROUND OF THE TECHNOLOGY

The disclosed technology regards a mountable feed bucket suitable for securing to a fence rail, and a method of securing a feed bucket to a fence rail.

Presently feed buckets may be mounted to fence rails to provide a comfortable way to feed horses. However, frequently the feed buckets are weakly secured to the fence rail, and the horse is able to knock it off of the rail and on to the ground, thereby requiring that an individual retrieve the feed bucket from within the fenced area, which can be dangerous. Alternatively, feed buckets may be permanently secured to the fence rail; however, cleaning the buckets is difficult when so secured, and eventually they fail, leaving exposed screws as a hazard to both humans and animals. Therefore, there is a need to develop a mountable feed bucket that may be easily positioned and removed from a fence rail, but is secured so that a horse cannot remove the same from its position on the rail.

The disclosed technology provides a mountable feed bucket that may be easily positioned and removed from the fence rail by a person, but is secured so that the horse cannot remove the same from its position on the rail. Further, the disclosed technology provides a method for mounting a feed bucket on a fence rail in a manner that allows it to be easily positioned and removed from the fence rail, but secures the feed bucket so that a horse cannot remove the same from its position on the rail.

GENERAL DESCRIPTION OF THE DISCLOSED TECHNOLOGY

The disclosed technology regards a mountable feed bucket suitable for securing to a fence rail. The mountable feed bucket includes a receptacle, one or more brackets affixed to the receptacle, and one or more affixation means.

The receptacle is defined by a top rim, a base, and front, back, and a pair of side walls, with a trough formed on the front wall of the receptacle.

One or more brackets are affixed to the receptacle, each bracket having at least two legs, the first leg extending orthogonally from the back receptacle wall, and the second leg extending perpendicular to the first bracket leg, at a first end of the first bracket leg, thereby forming a vacuous area between the back receptacle wall and the second bracket leg. This vacuous area is suitable for receiving a fence rail. The bracket may further include a third leg extending perpendicular to the first bracket leg, at a second end of the first bracket leg opposing the first bracket end. When present, the third bracket leg is at least partially affixed to the back receptacle wall. Any or all of the bracket legs may have ribs with (or without) reinforcing structure between at least a portion of the ribs, and the ribs may be grouped in sets (with or without reinforcing structure between the rib sets).

One or more affixation means are provided, each including a pin (with or without a foot) for securing the mountable feed bucket to a fence rail. The second bracket leg includes one or more apertures sized and configured to receive the pin of the affixation means. The pin of the affixation means is designed and configured to extend through and beyond the aperture a distance to securely abut against an outer face of the fence rail when the mountable feed bucket is positioned on the fence rail. The affixation means may be a lever system, such as a push-pull toggle clamp having a lever handle rotatably affixed to a pin.

The receptacle walls and base, and in some embodiments the bracket, may be formed together in a single mold, or in separate molds with one or more of the components adjoined together by plastic welding, tape, or glue.

The disclosed technology further regards a method of mounting a feed bucket on a fence rail. The method includes the steps of providing a mountable feed bucket including a receptacle defined by a top rim, a base, and front, back, and a pair of side walls, and further having a trough formed on the front side of the receptacle. The feed bucket useful in this method further includes one or more brackets affixed to the receptacle, each bracket having at least two legs, the first leg extending orthogonally from the back side of the receptacle, and the second leg extending perpendicular to the first bracket leg, forming a vacuous area between the back receptacle wall and the second bracket leg, the vacuous area being suitable for receiving a fence rail. In this method the feed bucket is further provided with affixation means, such as at least one push-pull toggle clamp comprising a pin and a lever for securing the mountable feed bucket to the fence rail. The second bracket leg comprises an aperture sized and configured to receive the pin of the affixation means, wherein the pin extends through the aperture a distance to securely abut against the outer face of the fence rail.

The method further includes the step of securing the mountable feed bucket to the fence by positioning the bracket about a fence rail so that the rail is at least partially within the vacuous area between the back receptacle wall and the second bracket leg. Thereafter, the method is practiced by inserting the pin of an affixation means through the aperture of the second bracket a distance so that the pin rests securely upon the fence rail, rotating the push-pull toggle clamp to cause the pin to be secured against the fence rail, and the feed bucket to be secured to the fence rail.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE DISCLOSED TECHNOLOGY

Figure 1:
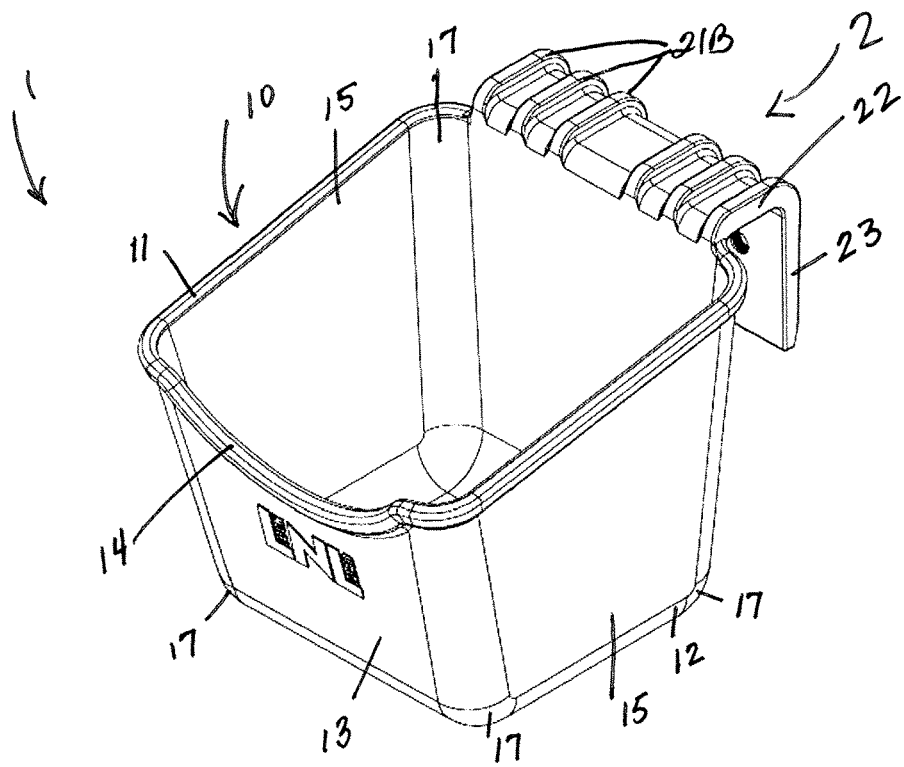
FIG. 1 is a peripheral view of an embodiment of the disclosed technology.
Figure 2:
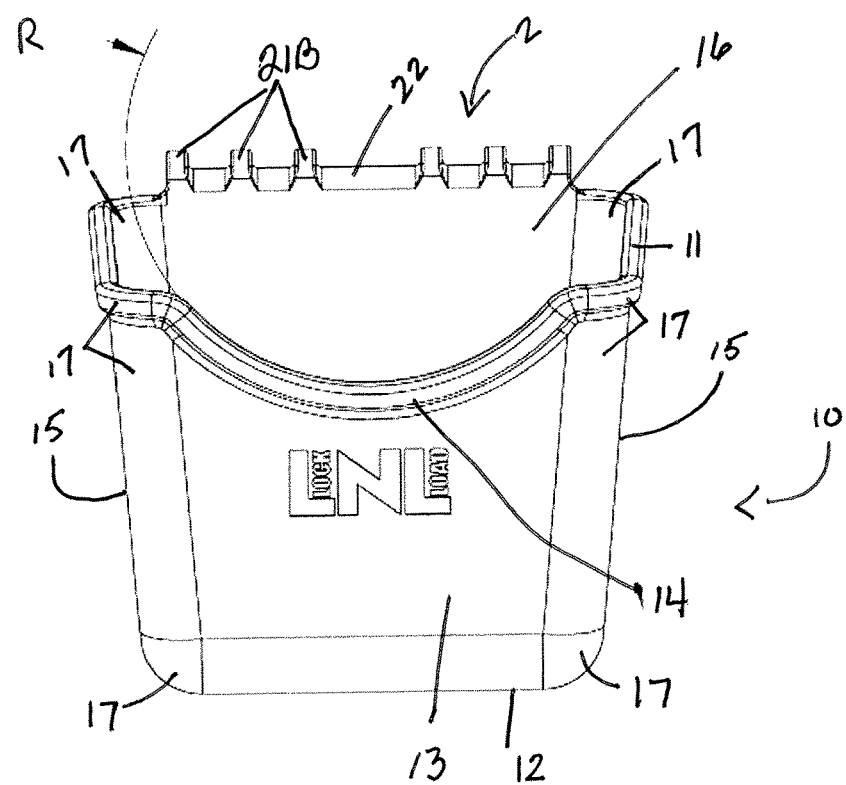
FIG. 2 is a front view of the embodiment of the disclosed technology shown in FIG. 1.
Figure 3:
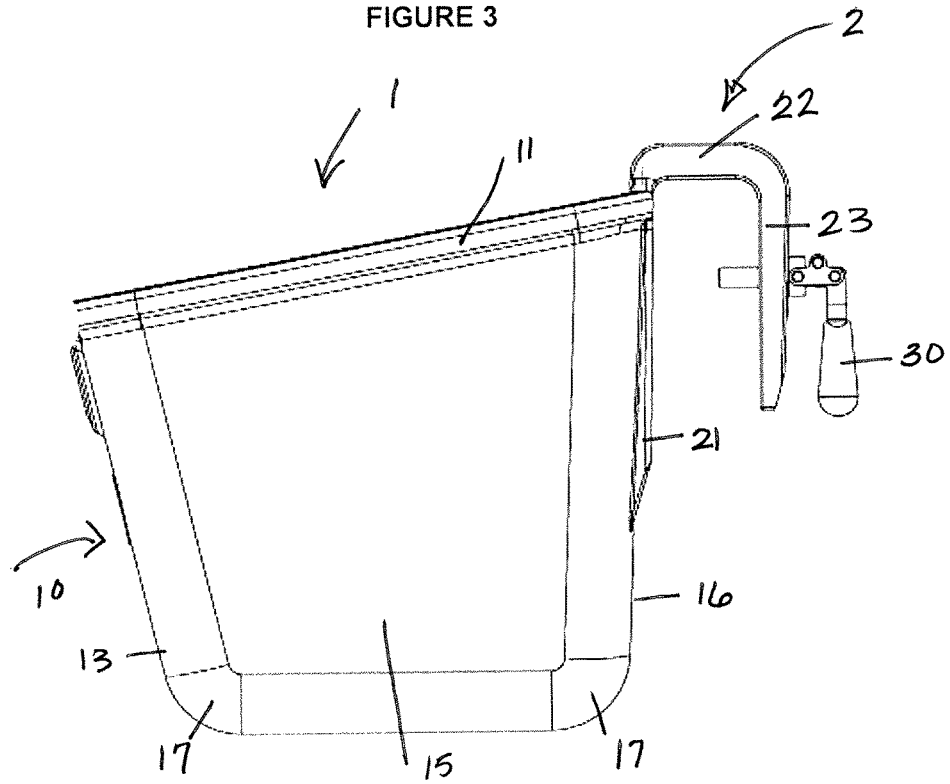
FIG. 3 is a side view of the embodiment of the disclosed technology shown in FIG. 1.

As shown in FIGS. 1-4, an embodiment of the mountable feed bucket 1 of the disclosed technology is formed from a high density polyethylene or polypropylene, comprising a receptacle 10 defined in some embodiments by a declining internal area from its top rim 11 to its base 12, and from its back wall 16 to its front wall 13, with a trough 14 formed on the front wall of the receptacle. The receptacle 10 at its top rim 11 may have (a) a width of between about 10-12", or in some embodiments 10.5", which width may vary from the back wall to the front wall; and (b) a length from its back wall to its front wall of between about 10-12", or in some embodiments 10.4". In this embodiment the receptacle 10 is further defined by a declining height from its back wall (between about 11-13", or in some embodiments 10.261") to its front wall (between about 7"-9", or in some embodiments 8.322"); wherein the front wall extends outward from the base 12 by an angle of 10-20 degrees from perpendicular, or in some embodiments about 15.83 degrees from perpendicular.

This embodiment of the receptacle 10 further comprises side walls 15 which may be slightly angled outward from the base wall 12 to the top rim 11 at an angle of 1-10 degrees from perpendicular, or in some embodiments about 5 degrees from perpendicular, and may be angled inward from the back wall 16, by 0.005 to 3 degrees from perpendicular, or 0.025 degrees from perpendicular. The trough 14 may extend with a radius of curvature R from the rim at the front side of the bucket, with a radius of curvature R of about 4"-6", or in some embodiments about 5".

The receptacle 10 may have a reinforced top rim 11, extending about the top surface of the receptacle, extending through the trough 14 on the front receptacle wall 13.

The walls of each of the front 13, back 16 and sides 15 of the receptacle may be about 0.2" to 0.75" thick; in some embodiments the wall thickness is about 0.445".

In some embodiments the edges 17 among the walls 13, 15 and 16 of the receptacle, and from its walls 13, 15 and 16 to its base 12, are curved, with a radius of curvature of 1" to 2", or in some embodiments 1.25".

Figure 6:
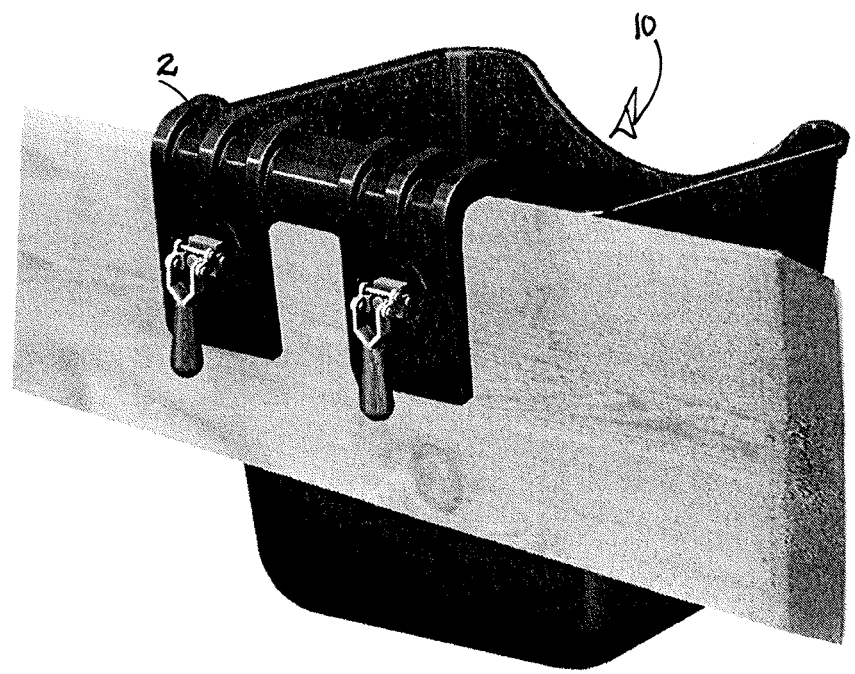
FIG. 6 is a perspective view of the embodiment of the disclosed technology shown in FIG. 1, installed on a fence rail in accordance with the method of the disclosed technology.

As shown in FIGS. 1-4, affixed to and extending along and from the back 16 of the receptacle 10 is a bracket 2, comprising two or three bracket legs. In some embodiments, the first bracket leg 22 extends orthogonally from the back receptacle wall 10. A second bracket leg 23 extends perpendicular to the first bracket leg 22, at a first end, forming a vacuous area between the back receptacle wall 16 and the second bracket leg 23, the vacuous area being suitable for receiving a fence rail as shown in FIG. 6.

In some embodiments the bracket includes a third bracket leg 21, extending perpendicular to the first bracket leg 22, at a second end of the first bracket leg opposing the first bracket leg end, wherein said third bracket leg is at least partially affixed to the back receptacle wall 16. The third bracket leg 21 may include a plurality of ribs 21A. The ribs 21A may number from 2 to 16, or more, and are affixed to or extending from the back wall 16 of the bucket, from the rim 11 to about or beyond half the depth of the back wall 16. The ribs 21A may be grouped together in two or more corresponding sets; these sets may be separated by a greater distance than the separation among the individual ribs 21A, by 1.5"-3", or about 2.150". The ribs may be between 0.25"-1" wide; in some embodiments the ribs are about 0.425" wide.

As shown in FIGS. 1-4, a second plurality of ribs 21B, numbering between 2 and 16, may extend in a u-shaped elbow to form the first bracket leg 22, beginning at or near the rim of the bucket to a distance above the plane of the rim of the bucket, extending orthogonally out from the back receptacle wall 16 to a first end, and perpendicularly traversing therefrom to a position relatively parallel to the back wall 16 of the bucket to form the second bracket leg 23, concluding at a position parallel to about or beyond the midpoint of the height of the ribs 21A; in some embodiments this second leg is between 3-7", or about 4.750", from the top of the first bracket leg 22. In some embodiments the first bracket leg 22 formed by the ribs 21B and corresponding support structure preferably extends above the top rim 11 of the receptacle by 0.2" to 2", or in some embodiments 0.7", with a relatively rectangular interior shape, the first bracket leg having a length of about 1" to 3", or in some embodiments 1.2", so that the bracket is sized, configured and affixed to the receptacle 10 so that the mountable feed bucket can be positioned on a standard square fence rail. In some embodiments the interior shape of the first bracket leg 22 (alone or in combination with the first bracket leg 21 and/or the second bracket leg 23) is differently shaped to accommodate and correspond with differently shaped fence rails or other support structures.

In some embodiments the number of ribs 21A is equal to the number of ribs 21B; in the embodiment shown in FIGS. 1-4, the ribs 21A differ from the number of ribs 21B (in the embodiment shown there are eight ribs 21A, grouped in two groups of four, and six ribs 21B, grouped in two groups of three). Each rib has a width of between about 0.25"-1", or about 0.425", and a thickness of between 0.25"-0.5", or about 0.375".

Figure 4:
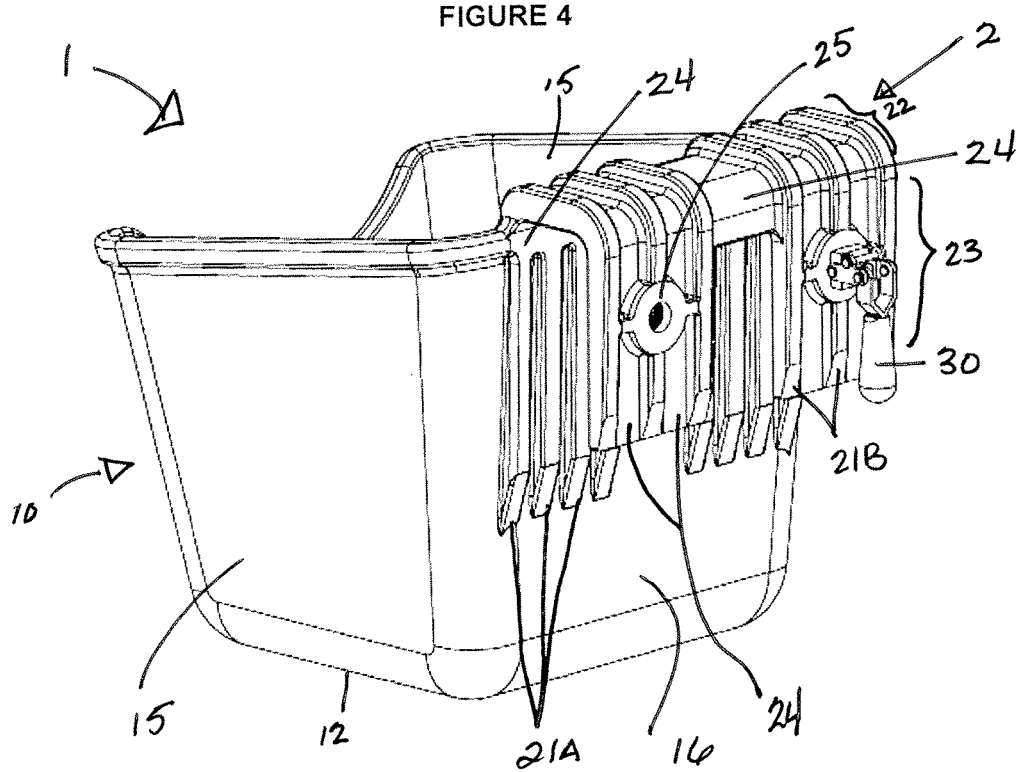
FIG. 4 is a peripheral view from the back of the embodiment of the disclosed technology shown in FIG. 1.

As shown in FIG. 4, a reinforcing structure 24 may connect the tops of the ribs 21A at the back receptacle wall 16, below the rim 11, wherein the reinforcing structure may have a depth equal to the depth of the ribs 21A to form a solid surface collar at this portion of the first bracket leg 21. The reinforcing structure 24 may further extend down a portion or along the entire length of the third bracket leg 21, between ribs within a group of ribs, and/or between groups of ribs. Likewise or alternatively, the reinforcing structure 24 may extend between the ribs 21B, about the first bracket leg 22, and to a portion of or all of the length of the second bracket leg 23. The reinforcing structure 24 of the first and second bracket legs may have a thickness less than the ribs 21B, so that the ribs protrude from the surface of the reinforcing structure 22. In some embodiments as shown in FIGS. 1-4, the reinforcing structure may exist between two or more groupings of ribs 21B through their length of the first bracket leg 22, and in some embodiments extend into a portion or all of the length of the rib groupings of the second bracket leg 23.

Figure 5:
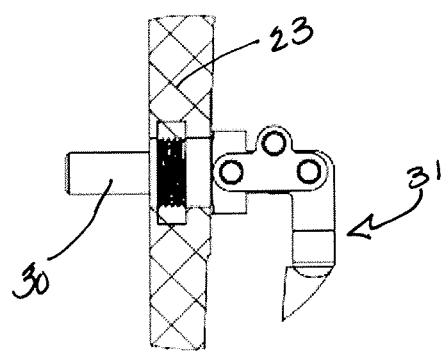
FIG. 5 is a side view of a portion of the second bracket leg and affixation means of the embodiment of the disclosed technology shown in FIG. 1.

Each of the groupings of ribs 21B may comprise an aperture 25 for receiving a securing mechanism 30, such as a lever system or a push-pull toggle clamp comprising a lever handle 31 rotatably affixed to a pin 32, as shown in FIG. 5. As shown in FIG. 4, the aperture 25 may have a thickness equal to the thickness of the ribs 21B, so as to form a flat surface to support the securing mechanism 30. The pin 32 extends through and beyond the aperture 25 a distance to securely abut against the outer face of the fence or other support structure. The center of the apertures may be positioned about 2"-3", or 2.5", from the bottom of the ribs 21C.

The elements of the receptacle, with or without the bracket, may be formed together in a single mold, or in any number of separate molds with one or more of the components adjoined together by plastic welding, tape, or glue.

The disclosed technology further regards a method of mounting a feed bucket on a fence rail. The method includes the steps of providing a mountable feed bucket including a receptacle defined by a top rim, a base, and front, back, and a pair of side walls, and further having a trough formed on the front side of the receptacle. The feed bucket useful in this method further includes one or more brackets affixed to the receptacle, each bracket having at least two legs, the first leg extending orthogonally from the back side of the receptacle, and the second leg extending perpendicular to the first bracket leg, forming a vacuous area between the back receptacle wall and the second bracket leg, the vacuous area being suitable for receiving a fence rail. In this method the feed bucket is further provided with at least one push-pull toggle clamp comprising a pin and a lever for securing the mountable feed bucket to the fence rail, wherein the second bracket leg comprises an aperture sized and configured to receive the pin of the affixation means, allowing the pin to extend through the aperture a distance to securely abut against the outer face of the fence rail. Suitable mountable feed buckets for this method include the feed buckets described above in this disclosure.

The method further includes the step of securing the mountable feed bucket to the fence by positioning the bracket about a fence rail so that the rail is within the vacuous area between the back receptacle wall and the second bracket leg. Thereafter, the method is practiced by inserting a pin of the affixation means through the aperture of the second bracket a distance so that the pin rests securely upon the fence rail, rotating the push-pull toggle clamp to a locked position (as shown in FIG. 5) causing the pin to removably secure the feed bucket to the fence rail.

The foregoing is considered as illustrative only of the principles of the invention; in particular, the dimensions aforedescribed are intended for illustration. Further, since numerous modifications and changes readily will occur to those skilled in the art, it is not desired to limit the invention to the exact construction and operation shown and described and, accordingly, all suitable modifications and equivalents may be resorted to, falling within the scope of the invention.

The invention claimed is:

1. A mountable feed bucket suitable for securing to a fence rail, the mountable feed bucket comprising:
   a receptacle defined by a top rim, a base, and front, back, and a pair of side walls, and further having a trough formed on the front wall of the receptacle;
   a bracket affixed to the receptacle, the bracket having three bracket legs, wherein
     a first bracket leg extends orthogonally from the back receptacle wall, the first bracket leg comprising a plurality of ribs,
     a second bracket leg extends perpendicular to the first bracket leg, at a first end of the first bracket leg, thereby forming a vacuous area between the back receptacle wall and the second bracket leg, the vacuous area being suitable for receiving a fence rail, the second bracket leg comprising two sets of two or more ribs,
     a third bracket leg extends perpendicular to the first bracket leg, at a second end of the first bracket leg opposing the first bracket leg end, the third bracket leg comprising two sets of two or more ribs affixed to the back receptacle wall and extending a length from the receptacle top rim to at least one-half of a height of the back receptacle wall, and wherein the ribs of the second bracket leg extend from the first end of the first bracket leg a length of at least one-half of the length of the ribs of the third bracket leg; and
   one or more affixation means comprising a pin for securing the mountable feed bucket to the fence rail, and
wherein the second bracket leg comprises an aperture sized and configured to receive the pin of the affixation means, and wherein the pin is designed and configured to extend through and beyond the aperture a distance to securely abut against an outer face of the fence rail when the mountable feed bucket is positioned on the fence rail.

2. The mountable feed bucket of claim 1, wherein the receptacle is formed from a high density polyethylene.

3. The mountable feed bucket of claim 1,
   wherein the back receptacle wall has a width of between about 10" and 12", and a height of between about 10" and 12";
   wherein the front receptacle wall has a width less than the width of the back receptacle wall, and a height of between about 7" and 9"; and
   wherein the receptacle trough has a radius of curvature of between about 4" and 6".

4. The mountable feed bucket of claim 1, wherein each of the side receptacle walls are positioned relative to the back receptacle wall at an angle of less than 90 degrees, and the front receptacle wall is positioned relative to the receptacle base at an angle of greater than 90 degrees.

5. The mountable feed bucket of claim 1, wherein the receptacle walls and the receptacle base each have a thickness of between about 0.4" and 0.5".

6. The mountable feed bucket of claim 1, wherein the receptacle top rim has a thickness greater than the thickness of the receptacle walls.

7. The mountable feed bucket of claim 1, wherein the third bracket leg extends above the receptacle top rim by between about 0.5" and 1.5".

8. The mountable feed bucket of claim 1, wherein portions of the ribs of each of the bracket legs are adjoined by a reinforcing structure.

9. The mountable feed bucket of claim 1, wherein the ribs of the first bracket leg and the ribs of the second bracket leg are aligned.

10. The mountable feed bucket of claim 1, wherein the first bracket leg comprises a curved exterior surface and a square interior surface.

11. The mountable feed bucket of claim 1, wherein the affixation means comprises a lever system.

12. The mountable feed bucket of claim 1, wherein the affixation means comprises a push-pull toggle clamp having a lever handle rotatably affixed to the pin.

13. The mountable feed bucket of claim 1, wherein the receptacle walls and the receptacle base are formed together in a single mold.

14. The mountable feed bucket of claim 1, wherein the receptacle walls, the receptacle base and the bracket are formed together in a single mold.

15. A mountable feed bucket suitable for securing to a fence rail, the mountable feed bucket comprising:
   a receptacle defined by a top rim, a base, and front, back, and a pair of side walls, and further having a trough formed on the front wall of the receptacle;
   a bracket affixed to the receptacle, the bracket having three bracket legs, wherein
     the first bracket leg extends orthogonally from the back receptacle wall,
     the second bracket leg extends perpendicular to the first bracket leg, at a first end of the first bracket leg, thereby forming a vacuous area between the back receptacle wall and the second bracket leg, the vacuous area being suitable for receiving a fence rail,
     the third bracket leg extends perpendicular to the first bracket leg, at a second end of the first bracket leg opposing the first bracket leg end, wherein the third bracket leg is at least partially affixed to the back receptacle wall, each of the first, second and third bracket legs comprises two sets of two or more ribs, and wherein a reinforcing structure adjoins at least a portion of the ribs within each of the sets of ribs, along at least a portion of a length of each of the bracket legs, and wherein the reinforcing structure of the first bracket leg and the second bracket leg has a thickness less than a thickness of the ribs of the bracket leg, so that the ribs protrude from the surface of the reinforcing structure, and wherein the reinforcing structure of the third bracket leg has a thickness equal to a thickness of the ribs of the third bracket leg to form a solid surface in the area of the reinforcing structure, and a pin for securing the mountable feed bucket to the fence rail, wherein the second bracket leg comprises an aperture sized and configured to receive the pin, and wherein the pin is designed and configured to extend through and beyond the aperture a distance to securely abut against an outer face of the fence rail when the mountable feed bucket is positioned on the fence rail.

16. A method of mounting a feed bucket on a fence rail, the method comprising the steps of:
 a. providing a mountable feed bucket comprising:
  a receptacle defined by a top rim, a base, and front, back, and a pair of side walls, and further having a trough formed on the front side of the receptacle;
  a bracket affixed to the receptacle, the bracket having three legs, wherein the first bracket leg extends orthogonally from the back side of the receptacle; wherein the second bracket leg extends perpendicular to the first bracket leg, forming a vacuous area between the back receptacle wall and the second bracket leg, the vacuous area being suitable for receiving a fence rail; and wherein the third bracket leg extends perpendicular to the first bracket leg, at a second end of the first bracket leg opposing the first bracket leg end, wherein the third bracket leg is at least partially affixed to the back receptacle wall; and
  wherein the bracket legs each comprise at least two sets of two or more ribs, wherein the ribs of the third bracket leg are affixed to the back receptacle wall and extend a length from the receptacle top rim to at least one-half of a height of the back receptacle wall, and wherein the ribs of the second bracket leg extend from the first end of the first bracket leg a length of at least one-half of the length of the third bracket leg ribs,
  a pin for securing the mountable feed bucket to the fence rail,
  wherein the second bracket leg comprises an aperture sized and configured to receive the pin, and wherein the pin extends through the aperture a distance to securely abut against an outer face of the fence rail;
 b. securing the mountable feed bucket to the fence by positioning the bracket about a fence rail so that the rail is within the vacuous area between the back receptacle wall and the second bracket leg; and
 c. inserting the pin through the aperture of the second bracket a distance so that the pin rests securely upon the fence rail.

17. The method of mounting a feed bucket on a fence rail of claim 16, wherein at least some of the ribs of the brackets of the mountable feed bucket are adjoined by a reinforcing structure.

18. The method of mounting a feed bucket on a fence rail of claim 17, wherein the reinforcing structure adjoins the ribs along at least a portion of a length of each of the bracket legs.

19. The method of mounting a feed bucket on a fence rail of claim 17, wherein the reinforcing structure of the second bracket leg has a thickness less than a thickness of the ribs of the second bracket leg, so that the ribs protrude from the surface of the reinforcing structure.

20. The method of mounting a feed bucket on a fence rail of claim 17, wherein the reinforcing structure of the third bracket leg has a thickness equal to a thickness of the ribs of the third bracket leg to form a solid surface in the area of the reinforcing structure.

* * * * *